United States Patent [19]

Fedegari

[11] Patent Number: 5,439,655
[45] Date of Patent: Aug. 8, 1995

[54] APPARATUS FOR WASHING AND STERILIZING RUBBER PLUGS OR THE LIKE WHICH MAY BE USED IN PHARMACEUTICAL CONTAINERS

[75] Inventor: Fortunato Fedegari, Pavia, Italy

[73] Assignee: Fedegari Autoclavi S.p.A., Pavia, Italy

[21] Appl. No.: 76,758

[22] Filed: Jun. 15, 1993

[30] Foreign Application Priority Data

Jun. 19, 1992 [IT] Italy .................... MI92A1522

[51] Int. Cl.$^6$ .................................................. A61L 2/00
[52] U.S. Cl. ................................. 422/297; 68/24; 68/58; 134/102.3; 134/159; 422/299; 422/302
[58] Field of Search .............. 422/297, 298, 299, 302, 422/27; 68/58, 142, 24, 140; 134/153, 159, 102.3, 132; 198/669; 366/227, 228

[56] References Cited

U.S. PATENT DOCUMENTS

| | | | |
|---|---|---|---|
| 1,204,357 | 11/1916 | Jefferson | 68/142 |
| 2,861,446 | 11/1958 | Petterson et al. | 68/140 |
| 2,884,287 | 4/1959 | Sommer | 68/140 |
| 3,138,167 | 6/1964 | Fisher | 134/153 |
| 3,487,840 | 1/1970 | Stenzel et al. | 134/112 |
| 3,498,839 | 3/1970 | Mehta | 134/132 |
| 3,506,021 | 4/1970 | Tapscott | 134/132 |
| 3,744,402 | 7/1973 | Piegza et al. | 134/153 |
| 3,853,622 | 12/1974 | Rutten | 134/153 |
| 3,995,458 | 12/1976 | Grunewald et al. | 68/140 |
| 4,719,933 | 1/1988 | Jackson | 134/65 |
| 4,829,792 | 5/1989 | Keith | 68/58 |
| 5,020,555 | 6/1991 | Nishibayashi | 134/132 |
| 5,211,039 | 5/1993 | Pellerin | 68/58 |
| 5,223,229 | 6/1993 | Brucker | 422/298 |
| 5,238,660 | 8/1993 | Dietwart | 134/153 |

FOREIGN PATENT DOCUMENTS

| | | |
|---|---|---|
| 0460344 | 12/1991 | European Pat. Off. |
| 3011517 | 10/1981 | Germany |
| 3248555 | 3/1988 | Germany |
| 3841930 | 6/1990 | Germany |

Primary Examiner—James C. Housel
Assistant Examiner—Laura E. Collins
Attorney, Agent, or Firm—Griffin Butler Whisenhunt & Kurtossy

[57] ABSTRACT

Apparatus for washing, rinsing, sterilizing and drying delicate components such as plugs for pharmaceutical use, or the like, formed by an autoclave chamber containing a substantially cylindrical rotating drum or basket with two helical members extending along the axis of the cylindrical basket, connecting an inlet opening with an outlet opening and projecting inside the basket, each being provided with a rounded internal edge and terminating in chutes emerging inside the outlet opening, the helical members thus formed enabling the plugs to be mixed when the basket rotates in one direction and to be unloaded from the basket when the latter rotates in the opposite direction, the rotating basket also being provided with a circumferential toothed rim which engages a gear wheel actuated by drive means to impart a rotary movement to the same and having inside at least one pipe arranged parallel to the axis of the cylinder and provided with spray nozzles directed toward the plugs present inside the basket to allow washing and, where necessary, silicone-coating of the plugs. The autoclave chamber is also provided with inlets for steam, for hot and cold air, and with vacuum connections to allow, in addition to the washing, silicone-coating and sterilization operations, also more or less intense drying of the plugs.

18 Claims, 9 Drawing Sheets

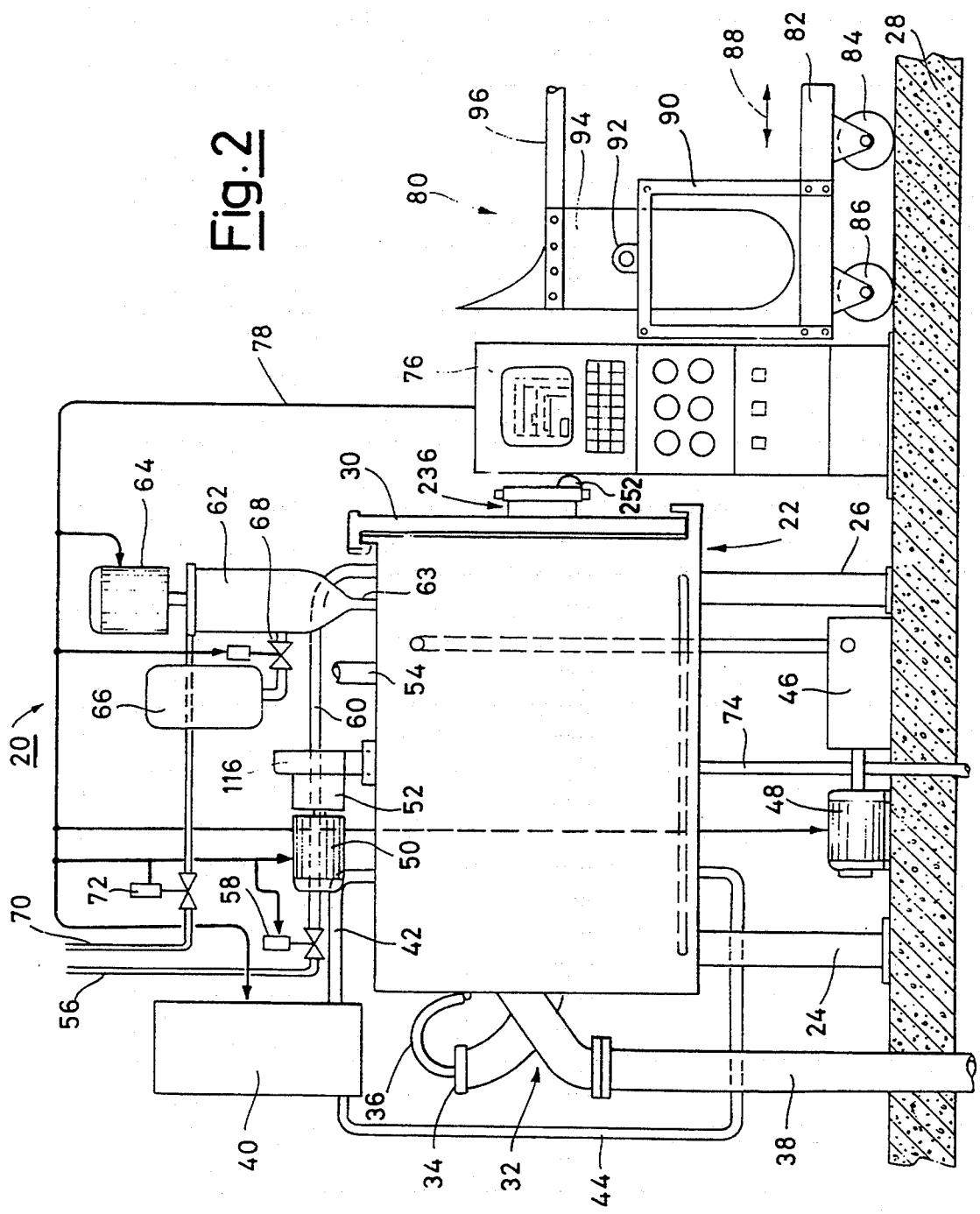
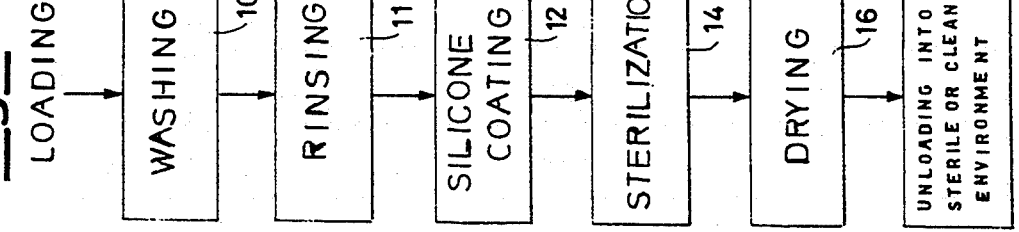

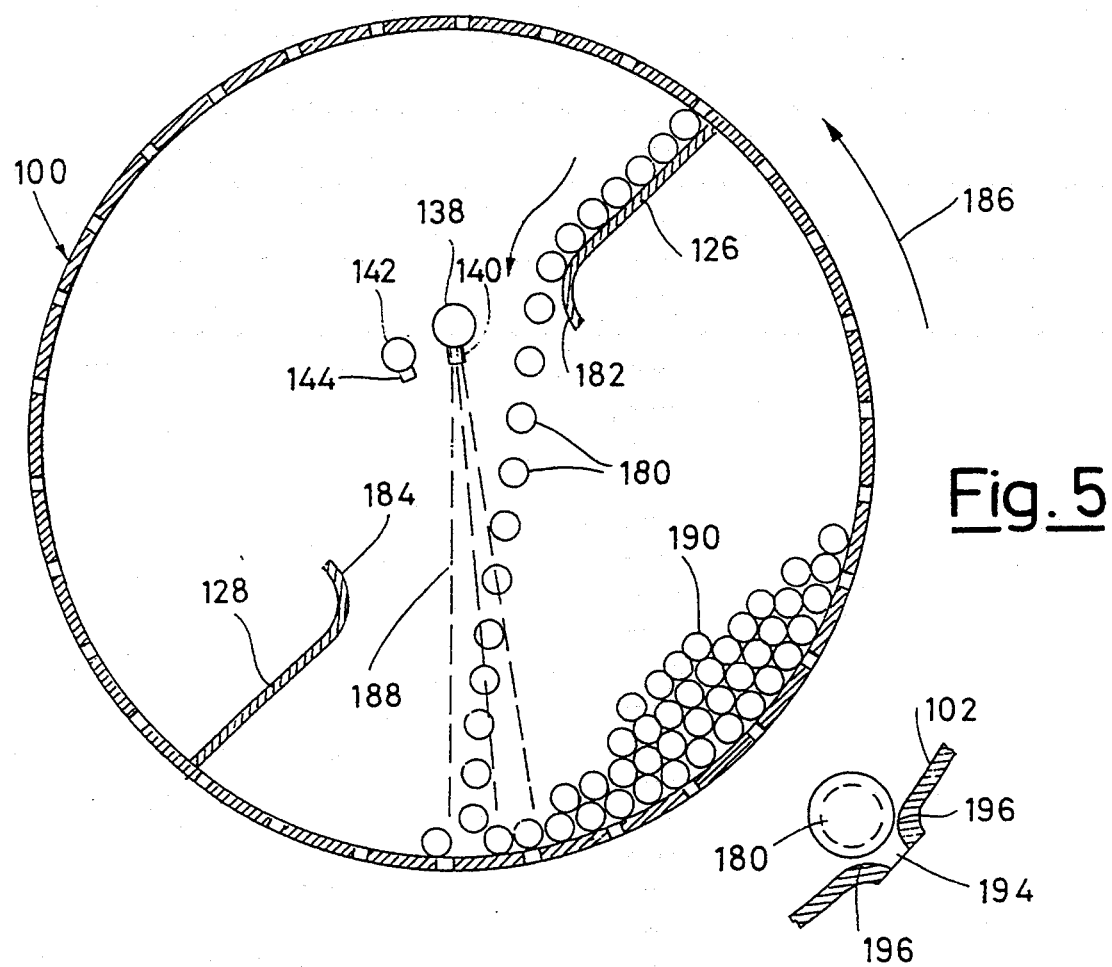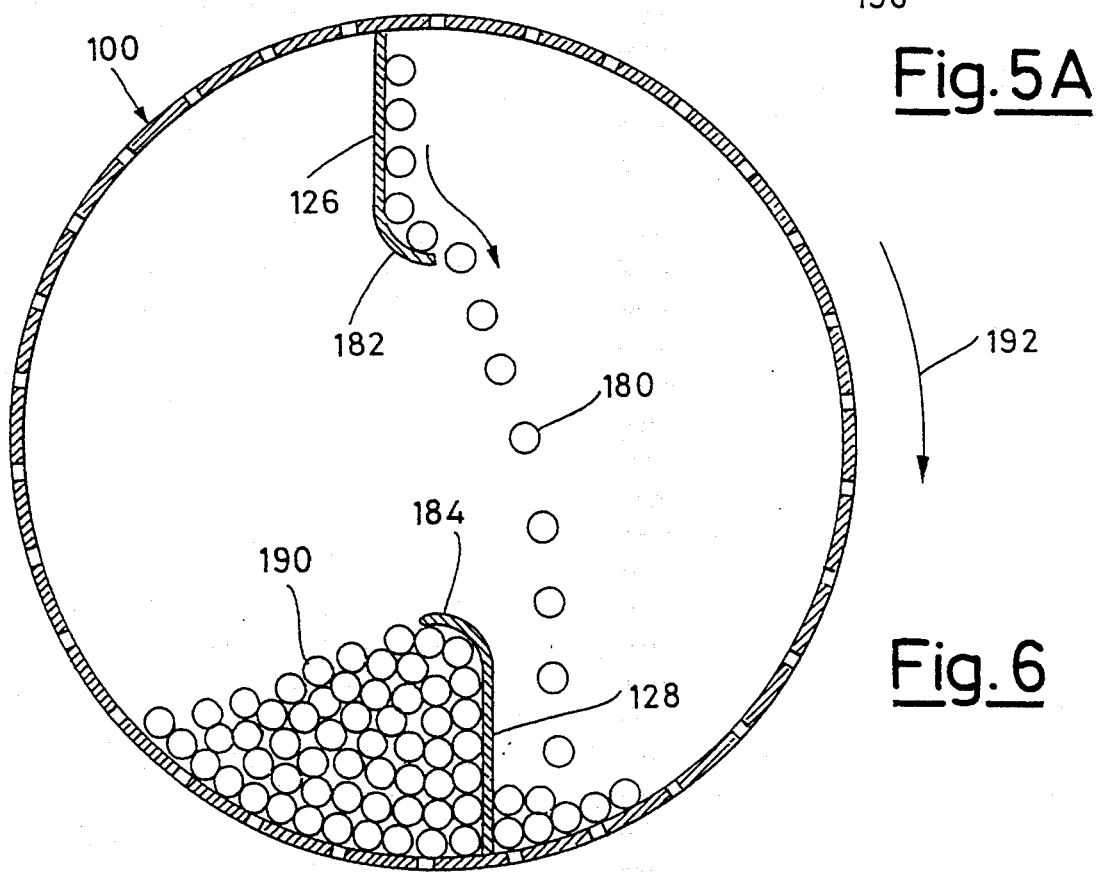

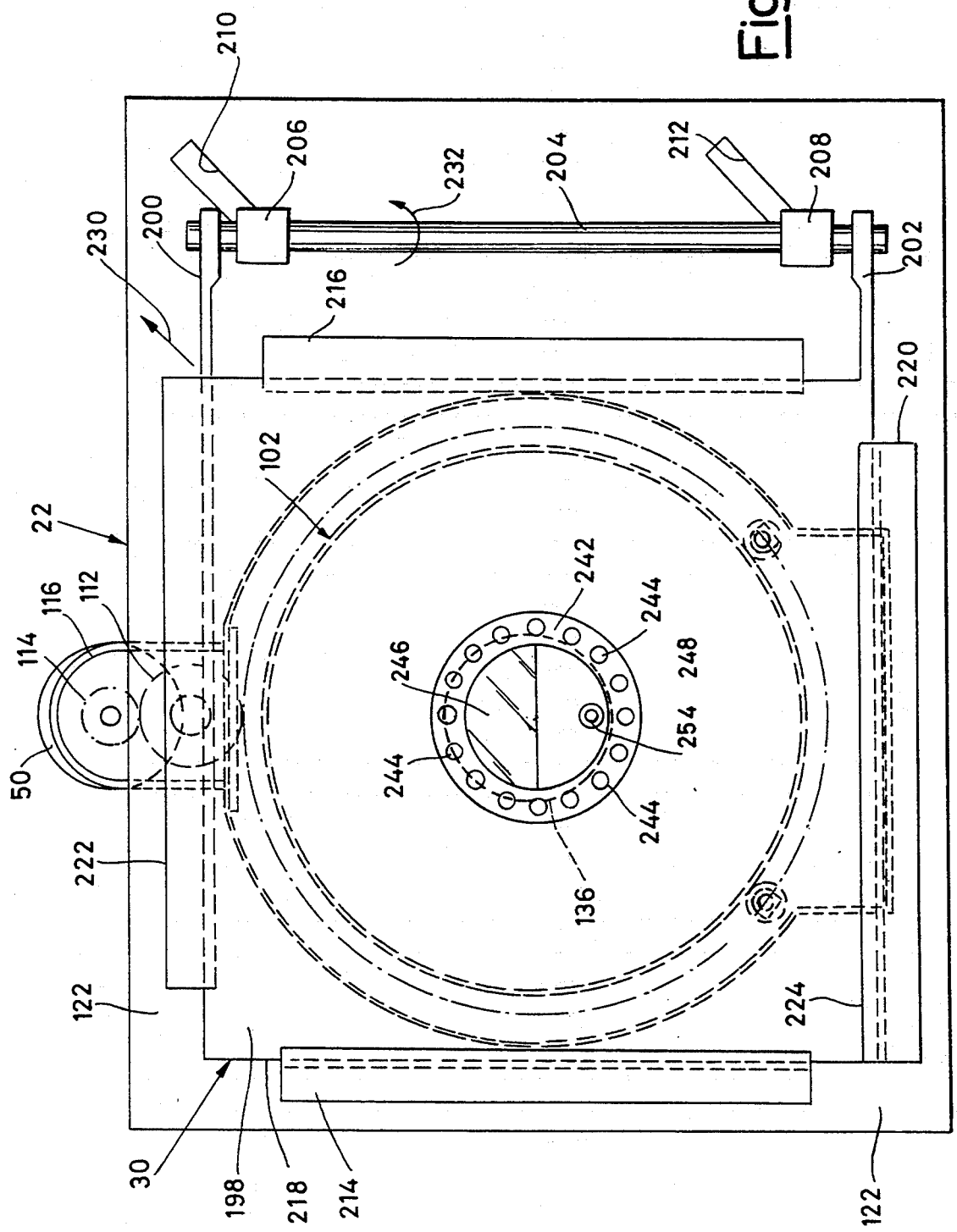

APPARATUS FOR WASHING AND STERILIZING RUBBER PLUGS OR THE LIKE WHICH MAY BE USED IN PHARMACEUTICAL CONTAINERS

The present invention relates to an apparatus for a) washing, b) rinsing, c) treating where necessary with additives, d) steam-sterilizing and e) drying delicate components of a pharmaceutical container.

These components include, among other things, plugs or stoppers and pistons made of elastomeric material, caps and covering devices; ring-nuts, capsules and other devices for fixing plugs and other members.

The abovementioned methods of treatment are nowadays applied in practice to all members of a drug container since these members must be as clean as possible, have a low microbe content and be dry.

The said methods of treatment assume greater importance when the drug is of the injectable type, and become of critical importance when the drug must be packaged under aseptic conditions, i.e. without final sterilization.

This is case, for example, when hygroscopic powders (for example antibiotics) are distributed in individual small bottles or when the product is obtained directly inside the bottles by means of a lyophilization process or when phial tubes are filled aseptically with a sterile fluid.

It is obvious that in these cases the plugs or small pistons must be sterile and be free of adherent particles. The plugs, moreover, must be perfectly dry if they are used to close bottles containing hygroscopic or lyophilized powders.

Treatment with additives may become of extreme importance when, for example, a very thin film of silicone (lubricant) must be spread on the members which are to be introduced into the necks of the bottles or flasks (plugs) or into prefilled syringes (pistons).

Since delicate components of this type have already been used for some time, it is obvious that apparatus for performing these operations of washing and sterilization of said plugs already exist. By way of an example of the prior art it is possible to mention published German Application Serial No. 3,011517 filed on 25 Mar. 1980, entitled "Kontinuierlich arbeitende Hochdruck-Wash- und Spuelanlage", (Continuous operation high-pressure washing and rinsing plant), and German Patent No. 3,248,555, filed on 29 Dec. 1982 and granted on 3 Mar. 1988, entitled "Maschine zum Reinigen empfindlicher Kleinteile, wie pharmazeutischer Verschlusselemente" (Machine for the cleaning of delicate small components, such as pharmaceutical closing members).

It should be pointed out that the plant described in the aforementioned published German Patent Application operates fairly well in regard to continuous washing of these pharmaceutical plugs, or the like, however, it does not allow in practice any steam-sterilization treatment of the said plugs, which, consequently, must be performed in a downstream apparatus. Moreover, as clearly stated in the same description of the aforementioned patent application, the number of plugs to be cleaned, which are conveyed continuously to the said plant, must be restricted in order to have said plugs forming inside the drum or rotating basket a single layer so as to allow correct washing of the plugs themselves, thus avoiding any transfer of dirt from one layer of plugs to another underlying layer. It follows that the main drawback of the herein disclosed plant consist in the fact that it is necessary to add a downstream apparatus for sterilization of the plugs, thus increasing the dimensions of the overall plant for washing and sterilizing the plugs, and in the fact that the quantity of plugs being treated is restricted, resulting in a reduction in the performance of the plant in terms of the number or weight of the plugs treated per unit of time.

In order to overcome the abovementioned drawbacks, a cleaning machine has been devised, as disclosed in the aforementioned German Patent No. 3,248,555, which does not operate continuously but in batch mode and enables both the plug cleaning (washing) operations and subsequent operations involving sterilization and silicone treatment (i.e. coating with silicone oil) of the said plugs to be performed. It should be pointed out, however, that this machine only partially achieves the results sought after, in particular with regard to correct washing of the plugs, since, being a machine which is intended to wash a large number of plugs at a time, a large number of plugs accumulate on the bottom of the horizontal rotating cylindrical basket of the said machine, such that the dirty water dripping from the last-washed plugs comes into contact with the plugs accumulated on the bottom of the basket, with the risk that the plugs are not cleaned properly on account of the redeposition of dirt on the said plugs accumulated on the bottom of the basket. Furthermore, since the basket rotates and jets of washing liquid are provided, oriented in a fixed manner with respect to said basket, it is necessary to ensure that nozzles generating said jets rotate together with the said basket, for example by providing a hollow shaft along the axis of the basket which acts as a supply duct for the nozzles and by connecting said hollow shaft to pipes for supplying washing liquid under pressure via a sealed rotating joint which in any case is a critical, costly and not easily maintainable component.

In addition, since the rotating basket is enclosed inside a sealed chamber which, like the basket, is substantially cylindrical and is provided with inlet and outlet hatches for the load arranged at two diametrically opposite points on the lateral surface of the said chamber, the basket must also be provided with at least one door or hatch which can be opened, so as to allow loading and unloading of the same via the two abovementioned inlet and outlet hatches of the said sealed chamber. This results in a further risk of contamination due to the said hatch on the basket because this hatch must be provided with closing means comprising at least a lever, fastening tooth and return spring, and, even if it were possible to avoid any lubrication of these closing means, inevitably the wear affecting operation of the said means would result in the release of metal particles inside the said basket, particles which, in accordance with the extremely stringent regulations governing the use of these machines in the pharmaceutical field, must be avoided as far as possible.

Therefore, an object of the present invention is to provide an apparatus for washing and sterilizing plugs, which avoids the abovementioned drawbacks of the prior art, having a particularly simple and economical design and being particularly reliable as regards operation.

Another object of the present invention is to provide an apparatus for washing and sterilizing plugs, which is provided with inlet and outlet openings for the said plugs, located, respectively, at the two axial ends of a rotating cylindrical washing basket installed inside a sealed chamber and without any closing door or hatch in order to avoid the danger of contamination resulting from the hatch components.

A further object of the present invention is to provide a washing and sterilization basket which is able to pass from one operation being performed on the plugs to unloading of the said plugs without any modification being made to the said basket, apart from reversal of its direction of rotation.

Another object of the present invention is to provide an apparatus for washing and sterilizing plugs which is able to provide washed and sterilized plugs with a moisture content which can be closely controlled.

The abovementioned aims are met by means of an apparatus for washing and sterilizing plugs consisting of an autoclave chamber containing a substantially cylindrical rotating drum or basket, wherein two opposed members extending along the axis of the cylindrical basket, connecting an inlet opening crossing a first base of the basket with an outlet opening crossing an opposed second base of the basket and projecting radially inside the said basket, are each provided with a rounded internal edge and terminating in slides emerging inside the outlet opening, the helical members thus formed enabling the plugs to be mixed when the basket rotates in a first direction and to be unloaded from the basket when the latter rotates in a second opposite direction.

Preferably each of the two helical members is formed by two axially aligned halves, those of which closest to the inlet opening have mounted on them a straight wall arranged substantially perpendicularly with respect to the helical member so as to form a kind of barrier for balanced distribution of plugs inside the basket.

The aforementioned along with other features of the present invention are defined and contained in the claims appended to the present specification and are described more fully, together with other aims and advantages, in the following detailed description of an embodiment of the said invention, not to be considered as restrictive, accompanied by the enclosed drawings in which:

BRIEF DESCRIPTION OF DRAWINGS

FIG. 1 shows the block diagram of a typical cycle for the treatment of plugs for pharmaceutical containers, performed by an apparatus according to the present invention;

FIG. 2 is a schematic diagram of an apparatus according to the present invention, as can be used, for example, in the pharmaceutical industry;

FIG. 5 is a schematic view, in cross-section, of a basket of the apparatus according to the invention, rotating in the direction required to perform the mixing operation associated with washing, sterilization, silicone-coating and, possibly drying of the plugs;

FIG. 5A is an enlarged view of a preferred type of hole for the rotating basket present in the apparatus according to the invention;

FIG. 6 is a schematic view, in cross-section, of the said basket rotating in the opposite direction required to achieve conveying of the plugs towards the unloading point of the apparatus according to the present invention;

FIG. 7 is a schematic front view of a particularly preferred loading hatch of the apparatus according to the present invention;

Figure 3:
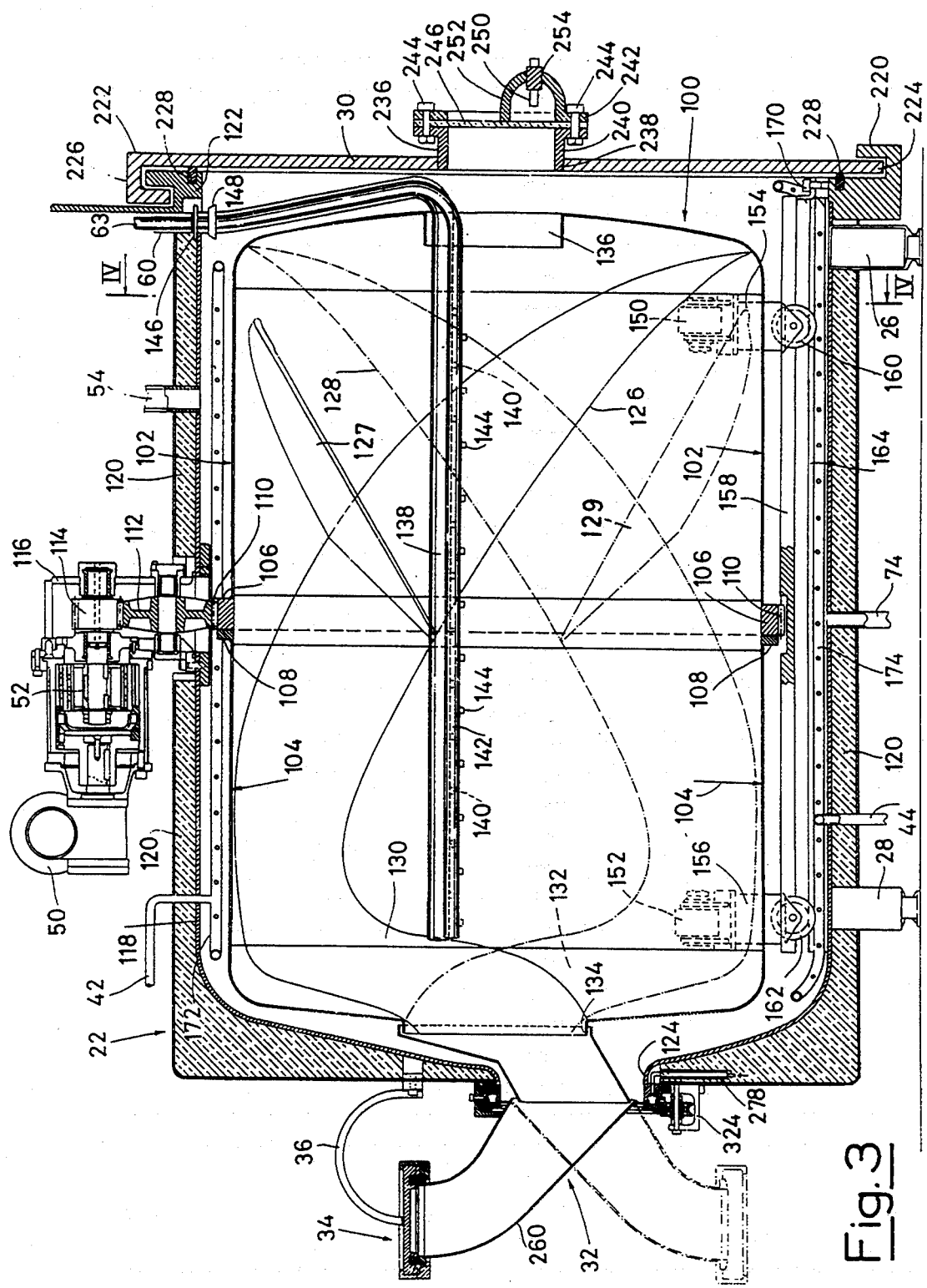
FIG. 3 is an overall view, in cross-section, of an apparatus according to the present invention, illustrating in particular a sealed autoclave chamber and a rotating drum or basket for performing the operations of washing, sterilizing, silicone-coating and drying, which are typically required for plugs used in pharmaceutical applications.

Let us consider first of all FIG. 1 which illustrates a typical cycle for the treatment of plugs for pharmaceutical use. Said plugs are subjected to a first washing cycle 10, followed by one or more rinsing cycles 11, by a silicone-treatment cycle 12, i.e. involving coating of the plugs with a film of silicone oil with the aim of facilitating both sliding of the said plugs during conveying to subsequent treatment stages and subsequent insertion into the necks of small bottles or the like, then by a sterilization cycle 14, by a drying cycle 16, until an acceptable moisture content of the said plugs is achieved, and finally by discharging, where necessary, into a sterile or clean area.

Figure 4:
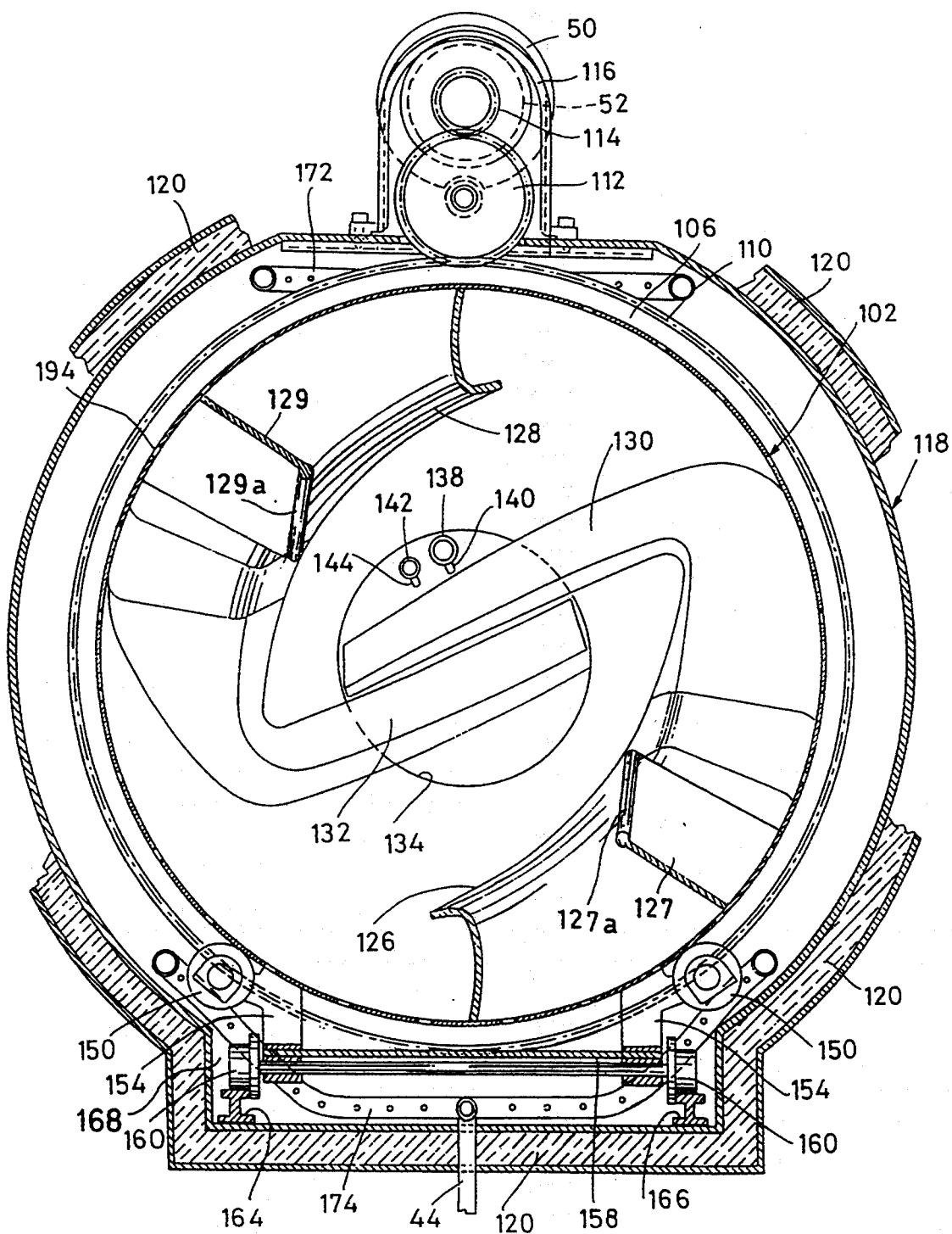
FIG. 4 is a view sectioned along the line IV—IV shown in FIG. 3.

An apparatus 20, generally designed for performing the treatment cycle shown in FIG. 1, is shown, as a whole, in FIG. 2 and in greater detail in FIGS. 3 and 4. This apparatus 20 comprises an autoclave chamber 22 resting by means of supports, such as columns 24 and 26, on a floor or base 28. The said autoclave chamber 22 comprises also an inlet door or hatch 30 of well known kind.

The said chamber 22 is also provided with an unloading connector 32 which can be rotated into two diametrically opposite positions: a first closed position where it is directed upwards and engaged with a lid 34 secured by means of a curved arm 36 to a wall of the chamber 22, and a second unloading position where it is connected to a duct 38 for conveying into a protected environment the treated plugs for further processing. Furthermore, the said chamber 22 is served by accessory equipment such as a steam generator 40, connected by means of ducts 42 and 44 to the chamber 22, a vacuum pump 46 operated by a motor 48 and able to provide the said chamber 22 with the desired reduced pressure levels, a drive unit 50 provided with a coupler or magnetic coupling 52, for transmitting movement inside the chamber without the need for any opening through the walls of the said chamber, an air inlet 54 for introducing hot air or cold air, as required, inside the chamber, a pipe 56 for water and any detergents which, via a control valve 58 and an inlet duct 60, conveys said water and detergents into the said chamber 22, an emulsifier 62 discharging into the chamber 22 via an inlet duct 63, operated by a motor 64 and supplied both with silicone oil from a storage tank 66 via a control valve 68 and with water from a pipe 70 via a control valve 72, for providing the autoclave chamber 22 with silicone oil emulsion prepared in each case according to requirements. At last a duct 74 allows the discharge of water, detergents and anything else which needs to be discharged from the chamber 22.

The whole abovementioned accessory equipment is operated from a control console 76 containing a processor with its peripheral units and electromechanical equipment for enabling, for example via a multiple cable 78, full control and operation of the whole apparatus 20.

A carriage 80 for supplying plugs to be treated inside the apparatus 20 comprises a platform 82 movable on wheels 84 and 86 in the directions indicated by a double arrow 88 and carrying a frame 90 supporting in a pivoted manner via hinges, such as the hinge 92 visible in FIG. 2, a container 94 for moving plugs, for example from a warehouse or a plug production plant to the said apparatus 20, inside which it may be upturned with the aid of means such as a lever 96.

If we now consider in particular FIGS. 3 and 4, it can be seen that the autoclave chamber 22 contains a rotating cylindrical basket 100 formed by two half-shells 102 and 104 connected together by means of two respective circular flanges 106 and 108, bolted together, the former of which is provided with a toothed rim 110 engaging a gear wheel 112 in turn actuated by a pinion 114 accommodated inside a small sealed chamber 116 and connected to the said magnetic coupling 52 actuated by the drive unit 50. The autoclave chamber 22 is provided with a sealed internal wall 118 provided with heat-insulating lining layers 120 and connected at the front to a structure or frame 122 for retaining and supporting the entrance door 30 and ending at the rear in an opening 124 for unloading parts of the apparatus according to the invention.

Inside the rotating basket 100, projecting inwards, there are mounted two helical members 126 and 128 extending along the axis of the said basket and carrying, mounted in their front halves housed in and connected to the front half-shell 102, straight walls 127 and 129, respectively, arranged substantially perpendicularly with respect to the said helical members 126 and 128 so as to form barriers for the balanced distribution of the plugs inside the basket during the washing, rinsing and sterilization phases when the plugs must simply be mixed inside the rotating basket 100 without advancing and amassing in the vicinity of the unloading opening 124 of the autoclave chamber 22, and ending in two chutes 130 and 132 emerging inside a rear circular outlet opening 134 while at the front they terminate in the vicinity of the wall of the front half-shell 102 around a circular inlet opening 136 adjacent to the inlet door 30. As can be seen in particular in FIG. 4, the two straight walls 127 and 129 terminate externally in expanded and rounded lips, 127a and 129a, respectively, so as to avoid any damaging of the plugs resulting from impact against sharp edges.

The circular inlet opening 136, in addition to admitting batches of plugs to be treated, accommodates in an axial direction at least a first pipe 138 for introducing water along with any washing detergents, equipped with a set of spraying nozzles 140 and connected to the duct 60 for introducing water and detergents. Although in theory not strictly necessary, the opening 136 is able to accommodate, again in the axial direction, a second pipe 142 which is also provided with a set of spraying nozzles 144 and is connected to a duct 63 for introducing silicone-oil emulsion. In fact it would be possible to use only a single pipe 138 for introducing both water and detergents and silicone emulsion; however it is preferred to keep the two pipes 138 and 142 and the two spraying assemblies 140 and 144 separate in order to avoid contamination with silicone emulsion (which easily produces incrustations) of the nozzles 140 designed to spray washing water onto the plugs. It should be noted that the pipe 138 projects in cantilever fashion inside the basket 100 and is fixed to the sealed internal wall 118 by means of a fast-action fixing member 146 such as a bolted flange or, even better, a fast joint member. The pipe 142 also projects in cantilever fashion inside the basket 100 and is also fixed to the sealed internal wall 118 by means of a fixing member, such as a fast joint member 148.

Still with reference to FIGS. 3 and 4, it can be seen that the cylindrical basket 100 rests on two pairs of rollers 150 and 152 in order to roll freely on the same when the toothed rim 110 is made to rotate, which pairs of rollers 150 and 152, pivotably hinged with brackets 154 and 156, are fixed to a frame 158 mounted on wheels 160 and 162 travelling on rails 164 and 166 which are in turn accommodated inside a niche or recess 168 connected to the said sealed internal wall 118 of the autoclave chamber 22. The frame 158 is then fixed in some way, for example by means of one or more bolts 170, to the said wall 118 so as to remain stationary, together with the basket 100, inside the autoclave chamber 22, while simple slackening of the bolt or bolts 170 is able to allow the entire frame 158 with the basket 100 above to be pulled out from the chamber 22. This operation is performed rather frequently after a certain number of plug treatment cycles in order to eliminate all the treatment residue (such as traces of silicone oil, residue material from the plugs and the like) which may be deposited on the walls of the basket 100 and on the wall 118 of the chamber 22.

As can be seen again in FIGS. 3 and 4, the upper steam duct 42 and the lower steam duct 44 are connected respectively to an upper steam distributor 172 and to a lower steam distributor 174 in the form of a perforated tubular loop which enables the steam to be conveyed in a substantially uniform manner throughout the chamber 22.

Let us consider now FIGS. 5 and 6 in order to fully understand how, by changing the direction of rotation of the basket 100, it is possible to achieve either mixing of the plugs 180, necessary for the washing, silicone-coating, sterilization and drying operations, or distribution of the said plugs along the helical members 126 and 128 and conveying towards the outlet opening 134. For this purpose the two helical members 126 and 128 are both provided with rounded internal edges 182 and 184, respectively, which on the convex side act as receiving surfaces to make the plugs 180 fall from the helical member 126, during rotation of basket 100 in the direction indicated by an arrow 186, across the said drum 100, causing them to pass through jets 188 produced by the nozzles 140 of the pipe 138 in order to ensure washing of the said plugs 180, or through similar jets from the nozzles 144 to ensure coating of the said plugs with silicone. Falling and mixing of the plugs 180 across the basket 100 also has the function, during sterilization when the entire basket is permeated by high-temperature steam, of turning over the said plugs and exposing them uniformly to the action of the steam.

The recessed side of the said internal edges 182 and 184 also collects and amasses the plugs 180 into piles 190 which are then conveyed towards the chutes 130 and 132 when the basket 100 is made to rotate in the direction of the arrow 192, passing at the highest point from one helical member 126 to the opposite helical member 128 until they reach the vicinity of the chutes 130 and 132 where they then begin to leave the basket 100 via the outlet opening 134.

Looking at FIG. 5, it can be seen that the plugs 180, during washing, fall in succession from the helical member 126, rolling over the rounded edge 182, pass through the jets 188 and are deposited on the internal wall of the basket 100, falling along the edge of the pile 190 so that the washing liquid of the jets 188 avoids most of the plugs of the pile 190 so that there is a minimum risk of redeposition of dirt removed from already-washed plugs accumulated in the pile 190. This results in satisfactory washing of the plugs 180 being achieved, with a smaller number of cycles, and hence in greater operating efficiency of the apparatus. To ensure that there is a small number of plugs along the edge of the pile, it is sufficient to regulate the speed of rotation of the basket 100 in accordance with criteria which are well-known to people skilled in this particular art.

Obviously it is necessary to prevent the treated plugs inside the basket 100 from being damaged as a result of impact against pointed ends and sharp edges and, for this purpose, as is already known for example in the field of laundry washing machines, the side wall of the basket 100, such as for example the half-shell 102, is provided with funnel shaped holes 194 which have, on the inside, a rounded lip 196 so that, when falling against, or rolling along a side wall, each plug 180 never encounters sharp edges, but merely sufficiently rounded lips, such as the lip 196 (see FIG. 5A in this connection).

Looking now at FIG. 7, the inlet door or hatch 30 preferred in this embodiment of the invention consists of a swing-door 198 fixed by means of hinges 200 and 202 rotatable about a spindle 204 mounted on two ball-bearing supports 206 and 208 movable inside diagonal slots 210, 212. The swing-door 198 is provided with means for anchoring to the door structure or frame 122, such as a left-hand right-angled bracket 214 fixed to the frame 122, a right-hand right-angled bracket 216 formed integrally with the said swing-door 198, the right-angled bracket 214 engaging a corresponding left-hand side 218 of the swing-door 198 and the right-angled bracket 216 engaging a corresponding counter-bracket (not shown) integral with the frame 122, as well as a bottom bracket 220 fixed to the frame 122, and a top right-angled bracket 222 formed integrally with the swing-door 198, the bottom right-angled bracket 220 engaging a corresponding bottom side 224 of the swing-door and the top bracket 222 engaging a top counter-bracket 226 formed integrally with the frame 122 (see FIG. 3). The tightness of the hatch 30 is ensured by an emerging gasket 228 (also shown in FIG. 3) of well known kind actuated by compressed air.

The procedure for opening the hatch 30 consist in that the ball-bearing supports 206 and 208 move along the slots 210 and 212, causing a translatory movement of the swing-door 198 in the direction of an arrow 230 and hence clearing the sides 218 and 224 of the said swing-door 198 the right-angled brackets 214 and 220 fixed to the frame 122 and the right-angled brackets 216 and 222 the corresponding counter-brackets fixed to the said frame 122 and subsequently the spindle 204 rotates in the direction of the arrow 232 so as to cause rotation and hence opening of the door 198.

As can be seen in FIGS. 2, 3 and 7, the hatch 30 is provided with an inspection port 236 making it possible, with suitable illumination, to see inside the basket 100 through the inlet opening 136. Looking in particular at FIGS. 3 and 7, it can be seen that this inspection port 236 comprises a short tubular sleeve 238 terminating externally in a first flat circular flange 240 on which a second flat circular flange 242 rests, being fixed to the first flange by means of bolts 244 and pressing a glass plate 246 against the said first flange. An illumination apparatus 248 consisting of a lamp 250, provided with reflecting mirror 252 and possible control pushbutton 254, allows a proper lightning of the inside of the basket and its contents for a visual inspection thereof.

Let us now look at FIGS. 8 to 11 in order to fully understand the structure and mode of operation of the unloading connector 32 together with its accessories and associated parts, such as the closing lid 34 fixed by means of the curved arm 36 to the wall 118 of the autoclave chamber 22 by means of screws or bolts 256 engaged in a bracket 258 welded to said wall 118.

As can be seen in the abovementioned figures, the unloading connector 32 is formed by a tubular elbow 260 welded to a disc-shaped flange 262 which rests against a flat circumferential flange 264 having substantially the shape of a circular rim which is turn fixed to the sealed internal wall 118 of the autoclave chamber 22. The said flat flange 264 has mounted on it a certain number of circular segments (ideally three) 266, 268, 270 provided with a right-angled profile and fastened for example by means of bolts, such as the bolt 272, clamping and keeping joined together the two flanges 262 and 264.

Figure 8:
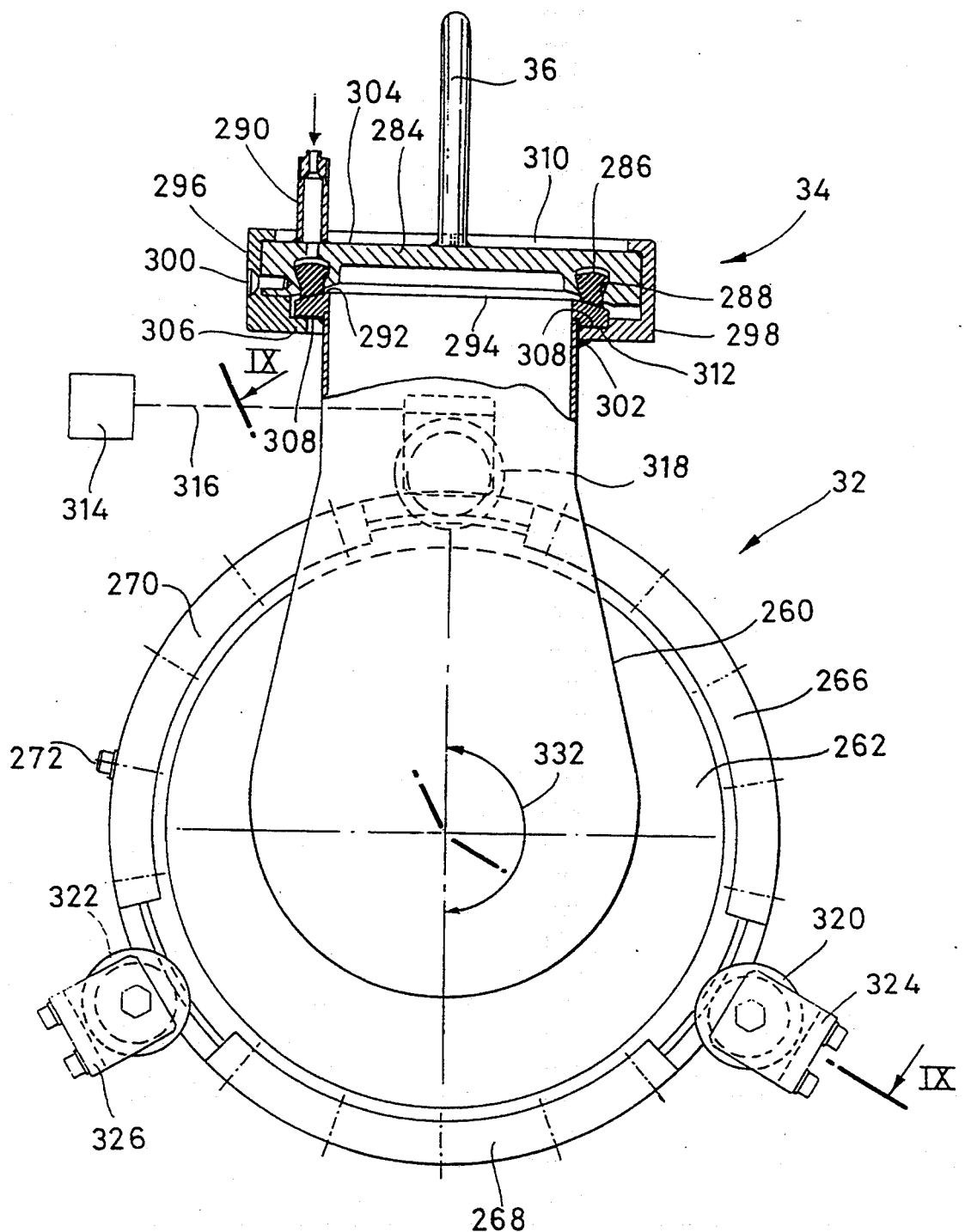
FIG. 8 is a partially sectioned rear view of a preferred unloading connector of the apparatus according to the present invention in the closed position allowing treatment of the plugs to be performed.
Figure 9:
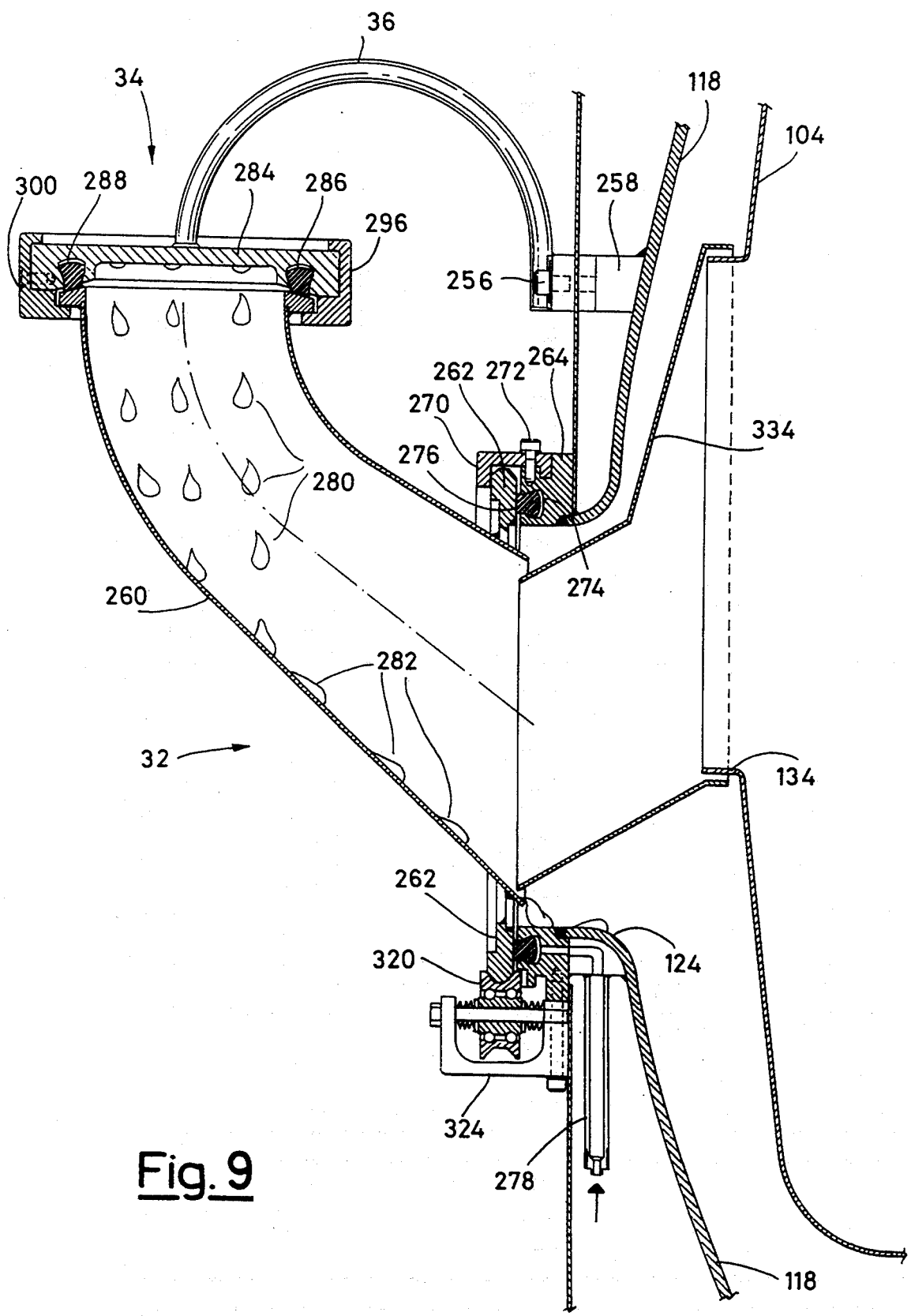
FIG. 9 is a sectioned and detailed side view of the said unloading connector shown in the closed position, along the line IX—IX of FIG. 8.
Figure 10:
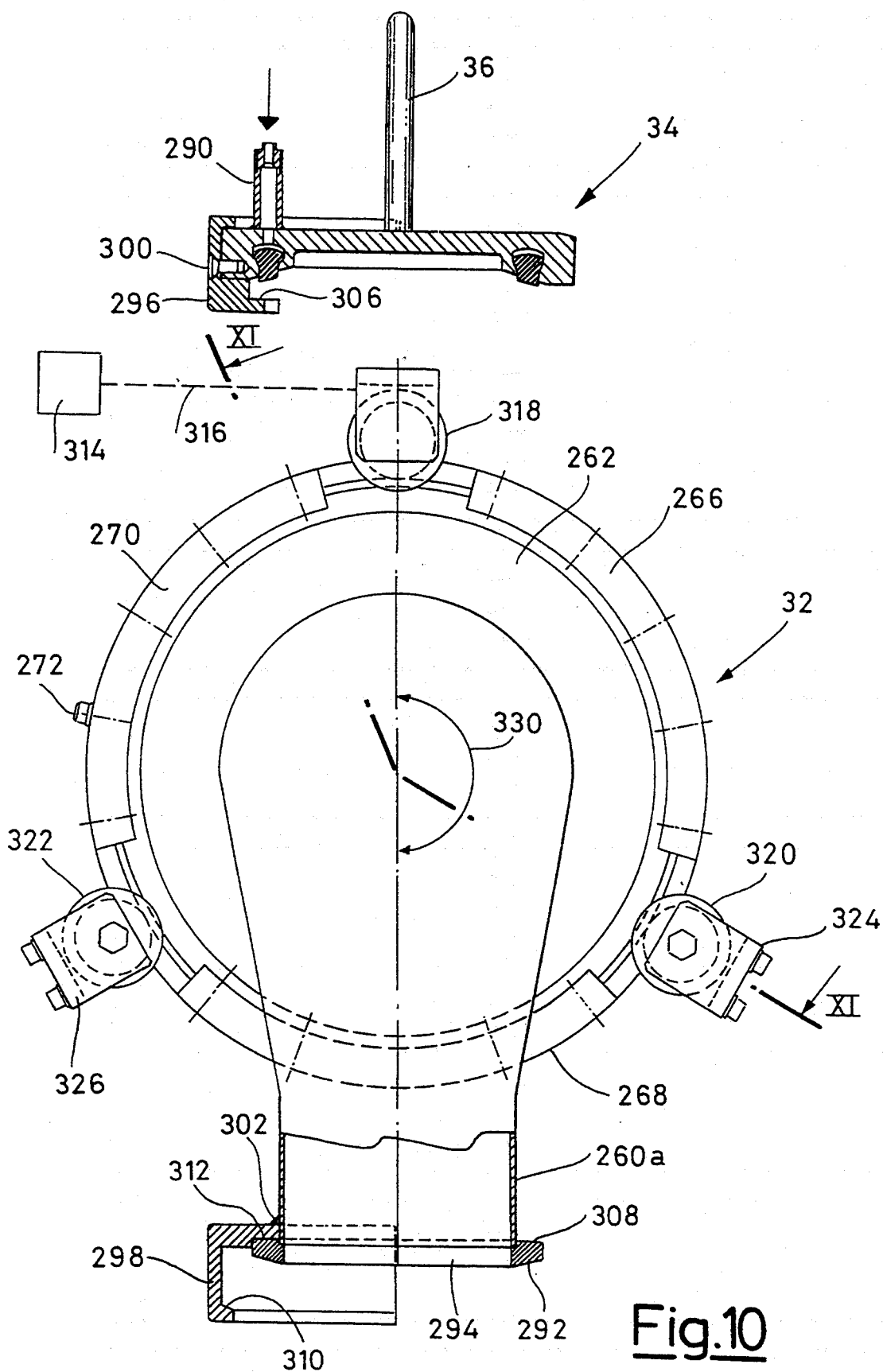
FIG. 10 is a partially sectioned rear view of the said unloading connector in the open position for allowing unloading of the apparatus according to the present invention.
Figure 11:
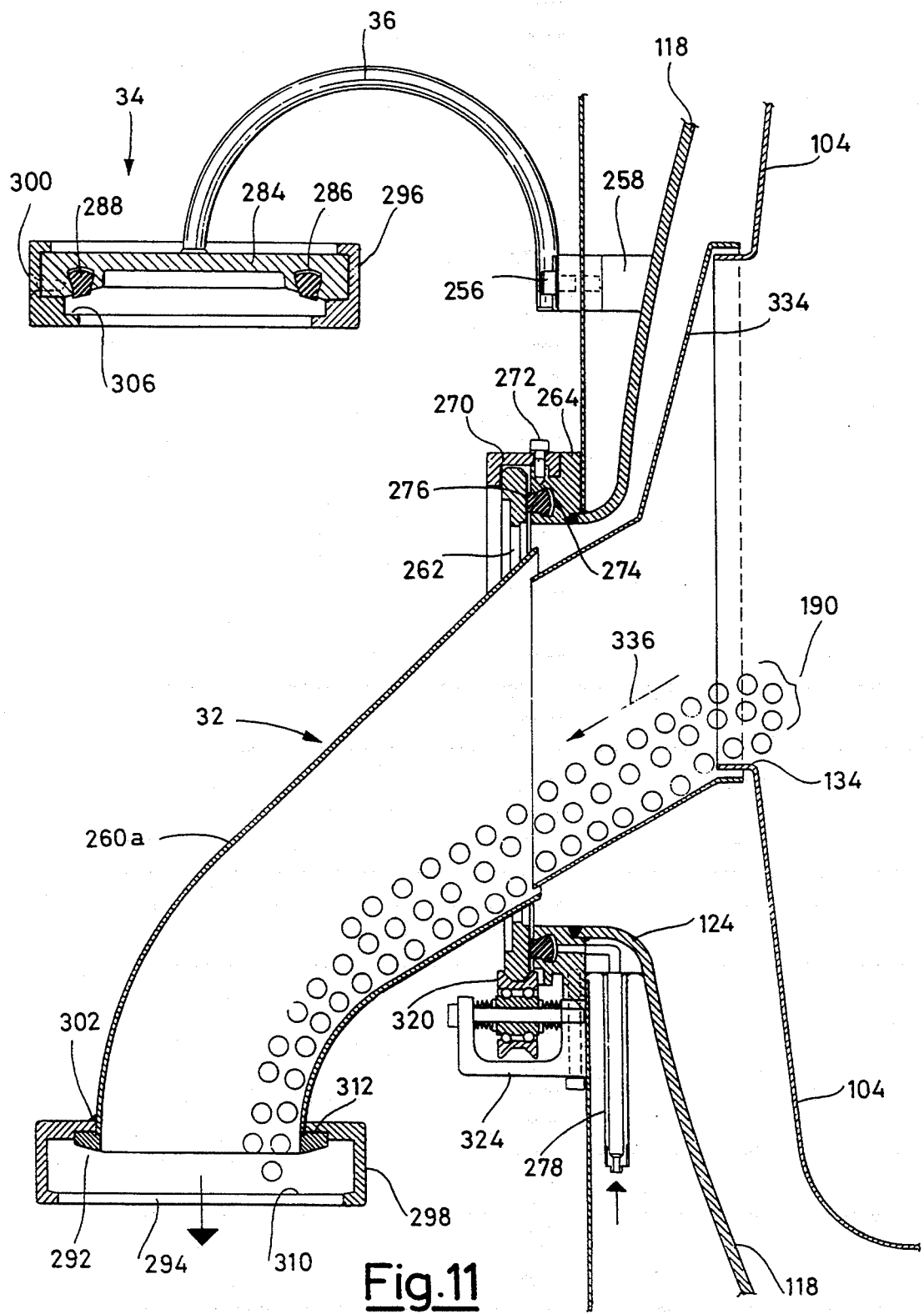
FIG. 11 is a sectioned and detailed side view of the same connector shown in the open position, along the line XI—XI of FIG. 10.

The external face of the flat circumferential flange 264 has formed in it a circular recess 274 designed to accommodate an emerging gasket 276, which produces a sealing action against the internal face of the disc-shaped flange 262 when a fluid under pressure, such as compressed air, is conveyed to the cavity 274 via a duct, such as the duct 278 depicted in FIGS. 9 and 11. When the gasket 276 emerges, pressing against the internal face of the disc-shaped flange 262, it also locks the said flange against the segments 266, 268 and 270, thus preventing any possible rotation thereof. Obviously it is sufficient to release pressure from the cavity 274 in order to lower the gasket 276 and leave the flange 262 free to rotate from the position shown in FIG. 8 to that of FIG. 10 and viceversa.

Looking at FIGS. 8 and 9 together, it can be seen that during the plug treatment cycles the said plugs must be retained inside the autoclave chamber 22 and more precisely inside the rotating basket 100 and hence the unloading connector 32 must remain hermetically sealed and preferably be directed upwards so as to prevent the accumulation of condensed water inside the said connector, which could easily form during sterilization cycles when use is made of high-pressure saturated steam which condenses easily even at temperatures far higher than 100° C., said condensed water in the form of droplets 280 and 282 being able to accumulate inside the elbow 260 and fall inside the autoclave chamber 22. In order to provide a hermetically sealed closure of the elbow 260 when the latter is directed upwards, use is made of a lid 34 formed essentially by a circular disc 284 welded at the top to the curved arm 36 and provided with a circular recess 286, which is open on its lower face, for accommodating an emerging gasket 288 which may be of the same kind of the abovementioned gasket 278 and 276, and which is made to emerge by the application of fluid under pressure, such as compressed air, via a duct 290 so as to press against a face 292 of an outlet mouth 294 of the elbow 260 in order to ensure a total sealing action between the disc 284 and the mouth 294. To prevent undesired movement between the disc 284 and the mouth 294, use is made of two collar means 296 and 298, the first of which is secured, for example by means of screws 300, to the said disc 284 and the second of which is secured by means of a weld 302 to the external end of the elbow 260. When the elbow 260 is rotated entirely upwards, assuming the position depicted in detail in FIG. 8, the left-hand collar means 296 keeps the left-hand part of the disc 284 joined to the left-hand part of the mouth 294 as a result of its upper lip 304 resting against the upper face of the disc 284 and its lower lip 306 resting against a projecting lip 308 of the said mouth 294, while the right-hand collar means 298 keeps the right-hand part of the disc 284 joined to the right-hand part of the mouth 294 as a result of its upper lip 310 resting against the upper face of the disc 284 and its lower lip 312 resting against the projecting lip 308 of the mouth 294 and owing to the action of the weld 302. Obviously the pressing action of the emerging gasket 288 completes the sealing effect obtained between the disc 284 and the mouth 294.

In order to separate the mouth 294 of the elbow 260 from the disc 284 of the lid 34, pressure must be released from the duct 290 so as to allow the gasket 288 to retract inside the recess 286, the flange 262 must then be made to rotate about its axis by disengaging it from the underlying flange 264 through retraction of the emerging gasket 276 into its recess 274, and finally, by actuating a motor 314, is actuated, via a mechanical drive 316, a pulley 318 engaged in the periphery of the disc-shaped flange 262, causing the rotation thereof which is also supported and driven by two other idle pulleys 320 and 322 pivotably hinged on respective support brackets 324 and 326. The action of the motor 314 causes rotation of the flange 262 and the associated elbow 260 in the direction of the arrow 330 shown in FIG. 10, bringing the elbow 260 of the connector 32 into the position 260a shown therein. Once the elbow has been positioned as illustrated in FIG. 10, it is sufficient to cause the gasket 276 to emerge from the recess 274 in order to fix the associated disc-shaped flange 262 in the position for unloading the apparatus. Obviously it is possible to imagine using, for the purposes of fixing and achieving a hermetic seal, a similar emerging gasket assembly between the mouth 294 and a corresponding joint on the duct 38 (FIG. 2) for conveying away the plugs from the apparatus 20.

To bring the elbow 260 back into the closed position where it is engaged with the lid 34, it is sufficient, by means of an operation which is substantially the reverse of the preceding one, to rotate the disc-shaped flange 262 and the associated elbow 260 in the direction of the arrow 332 shown in FIG. 8.

Unloading of the pile 190 of treated plugs is performed, as illustrated in FIG. 11, by means of a connecting funnel 334 which is inserted into the tubular elbow 260 and inside which the pile 190 of plugs flows when the basket 100 is made to rotate in the direction of the arrow 192 of FIG. 6. The said pile 190 of plugs then flows in the direction of the arrow 336 of FIG. 11, reaching other stations of a pharmaceutical plant which contains the apparatus according to the present invention.

At last it should be noticed that there is a precise reason for using the curved arm 36 to keep the lid 34 in the correct position. In fact, since, to satisfy the particular requirements of certain pharmaceutical products, the cycle for drying the said plugs 180 must be performed in a particularly intense manner so that particularly low moisture contents are achieved, it has been necessary to adopt so-called "flash-evaporation" drying cycles consisting in the cyclical application of reduced pressure to the mass of washed and sterilized plugs present inside the autoclave chamber 22, making use of the vacuum pump 46 for this purpose. The result is that the said chamber 22 passes periodically from high pressures, which are due to the steam used for sterilization, to low pressures, which are due to the flash-evaporation drying procedure and, consequently, the disc-shaped flange 262 tends to move away from the fixed circumferential flange 264 and the tubular elbow 260 tends to straighten when a high pressure is applied inside the chamber 22, while the flange 262 tends to move towards the flange 264, compressing the gasket 276, and the elbow 260 tends to become more curved when a reduced pressure is applied inside the chamber 22. As a result, the mouth 294 of the elbow 260 is not always located at exactly the same distance from the wall 118 to which the lid 34 is fixed by means of the arm 36 and hence the curved shape shown in FIGS. 2, 3, 9 and 11 is preferred for the arm 36 so as to be able to compensate easily for those variations in distance between lid 34 and wall 118 which may occur during treatment of the plugs.

The above description refers to a preferred embodiment of the present invention which must not be regarded as being restrictive in any way and therefore all those obvious variations in practice and those equivalent solutions which may occur to those skilled in this particular art as a result of reading this description must all be regarded as being protected herein. For example, in place of the rotatable unloading connector 32 with its lid 34, it is obviously possible to use any known intercepting element which prevents or allows communication between the autoclave chamber 22 and the discharge duct 38. Or else it is even possible to omit the discharge duct 38 and use in its place a carriage provided with sterile containers for conveying away the treated plugs from the apparatus 20. Furthermore, instead of the curved arm 36, it would also be possible to use a straight arm provided with a sliding attachment for the lid 34 kept in the most suitable position by spring means.

I claim:

1. An apparatus for washing, rinsing, sterilizing and drying delicate components and capable of loading and unloading the delicate components in an axial direction of the apparatus, comprising:
    (1) an autoclave chamber;
    (2) a substantially cylindrical basket disposed within the autoclave chamber and having a lateral inside wall, which basket is rotatable about a longitudinal axis thereof;
    (3) an inlet opening at a first axial end of the basket;
    (4) an outlet opening at a second axial end of the basket;
    (5) two opposed axially extending helical members radially projecting inside the basket with internal rounded edges and fixed to the lateral inside wall such that the helical members connect the inlet opening and the outlet opening such that the components are transportable from the inlet opening, through the basket, and out of the outlet opening by the helical members; each helical member terminating in a chute near the outlet opening, which chute of one helical member merges inside the outlet opening with the chute of the other helical member, wherein the components are mixed within the basket during a washing, rinsing, sterilization or drying thereof when the basket is rotated about the longitudinal axis in a first direction and are unloaded from the basket when the basket rotates about the longitudinal axis in a second opposite direction.

2. Apparatus according to claim 1, wherein the rotating basket is divided into two half-shells which are axially aligned and joined together by means of two flanges.

3. Apparatus according to claim 2, wherein the two helical members are formed by two axially aligned halves, wherein those halves which are accommodated inside a first half-shell which is closest to the inlet opening each have mounted thereon a straight wall, oriented substantially perpendicularly with respect to the associated helical members so as to form barriers for a balanced distribution of components inside the basket.

4. Apparatus according to claim 3, wherein one of the two flanges is provided with a circumferential toothed rim engageable with a gear wheel actuatable by drive means located outside the said autoclave chamber.

5. Apparatus according to claim 4, wherein the gear wheel is engageable with a pinion accommodated inside a sealed chamber communicating with said autoclave chamber and the hub is actuatable by a magnetic joint providing transmission of movement without physical openings in the sealed chamber and connected to said drive means.

6. Apparatus according to claim 1, wherein at least a first pipe penetrates inside the basket, parallel to the longitudinal axis thereof, said first pipe being provided with spray nozzles directed towards the components present inside the basket so as to allow washing and silicone-coating of the components.

7. Apparatus according to claim 6, wherein a second pipe also penetrates inside the basket, parallel to the axis of the basket, said second pipe being provided with spray nozzles so that the first pipe can supply water and washing detergent solutions for the components and the second pipe can supply a silicone-oil emulsion for coating the components with silicone.

8. Apparatus according to claim 1, wherein the autoclave chamber is provided with pipes connected externally to a steam generator and internally to distributors so that a sterilization of the components can be performed.

9. Apparatus according to claim 8, wherein the autoclave chamber is provided with an additional inlet connected to a vacuum pump to provide drying of the components.

10. Apparatus according to claim 2, wherein the autoclave chamber is provided with an unloading connector which can be oriented towards a closing lid fixed by means of an arm to a wall of the autoclave chamber towards a discharge duct departing from the apparatus.

11. Apparatus according to claim 10, wherein the arm has a curved shape and is elastic so as to respond to any distortion of the unloading connector.

12. Apparatus according to claim 10, wherein the unloading connector consists of a tubular elbow fixed to a disc-shaped flange rotatable about its axis of symmetry and resting against a fixed circumferential flange welded to a wall of the autoclave chamber, said disc-shaped flange being held against said fixed circumferential flange by means of circular segments with a right-angled profile which are fixed to the circumferential flange, and circumferential flange being provided with a recess accommodating an emerging seal for enabling the disc-shaped flange to be held and fixed against the circumferential flange.

13. Apparatus according to claim 14, wherein the disc-shaped flange is movable by a pulley actuated by a motor and is also guided by two other idle pulleys supported by brackets.

14. Apparatus according to claim 12, wherein the tubular elbow engages to form a closure, a disc forming part of the closure lid and is fastened against the said disc by means of the action of two collar means the first of which is fixed to the said disc and the second of which is fixed to the said tubular elbow.

15. Apparatus according to claim 14, wherein the disc is provided with a recess containing an emerging seal to engage a mouth of the said tubular elbow in order to provide sealing and fixing of the connector against the lid.

16. Apparatus according to claim 12, wherein the tubular elbow of the unloading connector communicates with a connecting funnel embracing the outlet opening of the rotating basket to allow, during unloading, transfer of a pile of treated components from the basket inside the autoclave chamber, to the discharge duct.

17. Apparatus according to claim 12, wherein in order to convey away a pile of treated components, a transportation carriage provided with sterile containers is used instead of the discharge duct.

18. Apparatus according to claim 1, wherein the basket has an external rounded wall which rests on at least two pairs of rollers pivotally mounted on brackets fastened to a frame suitable to slide inside and outside the autoclave chamber and the frame is born by wheels travelling in an axial direction on rails fastened to a recess in the autoclave chamber and said frame being fastened by means of at least a bolt to a retaining structure or door frame of the autoclave chamber.

* * * * *